(12) United States Patent
Karube et al.

(10) Patent No.: US 8,196,696 B2
(45) Date of Patent: Jun. 12, 2012

(54) VEHICLE FRAME STRUCTURE AND VEHICLE INCORPORATING SAME

(75) Inventors: Shinichi Karube, Saitama (JP);
Toshiyuki Suzuki, Saitama (JP);
Hiroyuki Kido, Saitama (JP); Ryota Yamagishi, Saitama (JP); Takeyuki Kariyasu, Saitama (JP); Naoki Kuwabara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 20 days.

(21) Appl. No.: 12/846,226

(22) Filed: Jul. 29, 2010

(65) Prior Publication Data
US 2011/0049855 A1 Mar. 3, 2011

(30) Foreign Application Priority Data
Aug. 25, 2009 (JP) ................................. 2009-194854

(51) Int. Cl.
*B62D 21/00* (2006.01)
*B62D 21/15* (2006.01)
(52) U.S. Cl. .................. 180/311; 280/781; 280/784
(58) Field of Classification Search .............. 180/311, 180/312; 280/781, 785, 798, 124.109, 784
See application file for complete search history.

(56) References Cited

U.S. PATENT DOCUMENTS

| 4,842,298 A * | 6/1989 | Jarvis ................ 280/124.154 |
| 7,658,258 B2 * | 2/2010 | Denney .................... 180/311 |
| 7,819,220 B2 * | 10/2010 | Sunsdahl et al. ........... 180/312 |
| 7,954,853 B2 * | 6/2011 | Davis et al. ................. 280/783 |
| 2008/0023240 A1 * | 1/2008 | Sunsdahl et al. .......... 180/68.2 |
| 2009/0183939 A1 * | 7/2009 | Smith et al. ................ 180/311 |
| 2010/0078926 A1 * | 4/2010 | Miura ....................... 280/785 |

FOREIGN PATENT DOCUMENTS
JP      2006-103370      4/2006

* cited by examiner

*Primary Examiner* — Joseph Rocca
(74) *Attorney, Agent, or Firm* — Carrier Blackman & Associates, P.C.; Joseph P. Carrier; William D. Blackman

(57) ABSTRACT

A vehicle frame structure includes a central frame member, extending in a vehicle longitudinal direction at a central portion of a body frame. The central frame member includes a front end joined to a second front cross pipe, and a rear end joined to a second lower crossmember behind the second front cross pipe. When viewed from the side, the central frame member extends in a substantially straight line along with the left and right front reinforcing pipes. The front end portion of the central frame member is joined to the second front cross pipe at a position inwardly of a joint between the left front reinforcing pipe and the second front cross pipe, and inwardly of a joint between the right front reinforcing pipe and the second front cross pipe. Such frame structure lowers level of a center of gravity of the vehicle, and enhances rigidity.

20 Claims, 11 Drawing Sheets

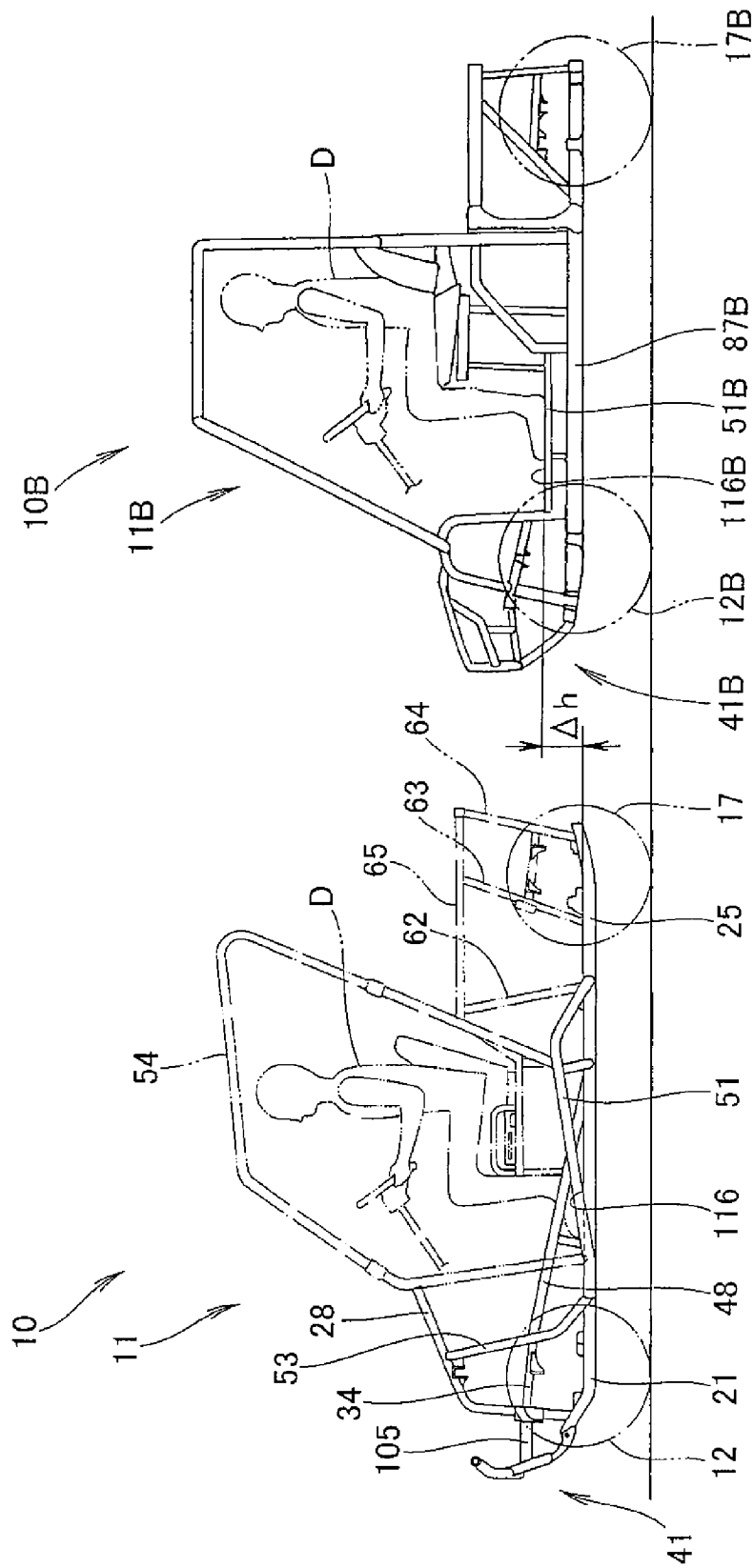

VEHICLE FRAME STRUCTURE AND VEHICLE INCORPORATING SAME

CROSS-REFERENCE TO RELATED APPLICATIONS

The present invention claims priority under 35 USC 119 based on Japanese patent application No. 2009-194854, filed on Aug. 25, 2009. The entire subject matter of this priority document, including specification claims and drawings thereof, is incorporated by reference herein.

BACKGROUND OF THE INVENTION

1. Field of the Invention

The present invention relates to a vehicle frame structure, and to a vehicle incorporating the same. More particularly, the present invention relates to a vehicle frame structure including a central frame member having a front end portion joined to a second front cross pipe at a position inwardly of a joint portion between a left front reinforcing pipe and the second front cross pipe, and also inwardly of a joint portion between a right front reinforcing pipe and the second front cross pipe, and a rear end portion thereof joined to frame body rear of the second front cross-pipe, and to a vehicle incorporating the same.

2. Description of the Background Art

There are known vehicles in which a body frame includes a front frame for suspending front wheels, a center frame having a seat on which an occupant sits, and a rear frame for suspending rear wheels. An example of such a body frame is disclosed in Japanese Patent Laid-open No. 2006-103370 (see FIG. 1 thereof).

According to Japanese Patent Laid-open No. 2006-103370 9 (as shown in FIG. 1 thereof) a vehicle body frame includes a center frame 13 (reference numerals from the reference are reproduced, which applies to the following) having a pair of left and right lower side frame sections 42, 42 extending in the longitudinal direction of a vehicle, and a pair of left and right sub-frame sections 73, 73 installed above the pair of respective left and right lower side frame sections 42, 42 and having a floor portion 32 on which occupants put their feet. In order to secure predetermined vehicle-body rigidity, the center frame 13 has an upper and lower two-step structure including the lower side frame sections 42 and the sub-frame sections 73.

Incidentally, in the recent years, low-floor and low-gravity-center vehicles seeking a more sporty driving feeling have required to suppress the vehicle gravity center to a further low level while ensuring predetermined vehicle-body rigidity.

Accordingly, it is one of the objects of the present invention to provide a vehicle frame structure that can suppress the vehicle gravity center to a further low level while ensuring vehicle-body rigidity.

SUMMARY OF THE INVENTION

In order to achieve the above objects, the present invention according to a first aspect thereof provides a vehicle frame structure having a body frame including a pair of left and right lower front frame sections extending in a lower portion of an vehicle body and in a longitudinal direction of a vehicle; a pair of left and right upper front frame sections joined to corresponding front ends of the lower front frame sections, extending once upward, then bending and extending in the longitudinal direction of the vehicle; a pair of left and right front reinforcing pipes joined to the respective upper front frame sections, extending in the longitudinal direction of the vehicle and having respective front wheel suspension arm attachment portions; a first front cross pipe connecting together front portions of the front reinforcing pipes; and a second front cross pipe connecting together rear portions of the front reinforcing pipes.

The vehicle frame structure further includes, at a general center of the body frame, a central frame member extending in the longitudinal direction of the vehicle, and having a front end portion thereof joined to the second front cross pipe and a rear end portion thereof joined to the body frame disposed behind the second front cross pipe. The central frame member substantially extends in a straight line along with the pair of left and right front reinforcing pipes, when viewed in side view. The front end portion of the central frame member is joined to the second front cross pipe at a position inwardly of a joint portion between the left front reinforcing pipe and the second front cross pipe, and also inwardly of a joint portion between the right front reinforcing pipe and the second front cross pipe.

The present invention according to a second aspect thereof is characterized in that a front bumper is attached to a front end portion of the vehicle body, a pair of left and right front bumper support pipes extend behind the vehicle from the front bumper, the pair of left and right front bumper support pipes are joined to the pair of respective left and right upper front frame sections; rear end portions of the pair of left and right front bumper support pipes are joined to corresponding joint portions each between a corresponding one of the pair of the left and right front reinforcing pipes and a corresponding one of the pair of left and right upper front frame sections; and the front bumper support pipes, the front reinforcing pipes and the central frame member extend substantially in a straight line, when viewed in a side view.

The present invention according to a third aspect thereof is characterized in that rigidity of the front bumper support pipes is less than rigidity of the front reinforcing pipes which are shaped circular in cross-section; and rigidity of the front reinforcing pipes is less than rigidity of the central frame member shaped rectangular in cross-section.

The present invention according to a fourth aspect thereof is characterized in that the body frame is divided into a plurality (three) of portions including a front frame portion supporting a drive system for a front wheel, a center frame portion provided behind the front frame portion to form an occupant's living space, and a rear frame portion provided behind the center frame portion, attached with an engine and supporting a drive system for a rear wheel. A driver's seat and an occupant seat on which occupants sit are arranged parallel to each other in a vehicle-widthwise direction on the center frame portion. A front final reducer for driving the front wheel is installed in the front frame portion. A propeller shaft for transmitting a drive force of the engine to the front final reducer is disposed at a vehicle body-widthwise general central portion. The central frame member is arranged such that it is positioned offset leftward or rightward from the propeller shaft. The central frame member and the propeller shaft overlap each other, when viewed in a side view.

The present invention according to a fifth aspect thereof is characterized in that a center console is disposed between the driver's seat and the occupant seat. The center console is configured to house portions of the center frame and the propeller shaft therebelow.

The present invention according to a sixth aspect thereof is characterized in that a pair of left and right central lower frame sections are arranged in a lower portion of the center frame portion so as to extend in the longitudinal direction of the vehicle; a pair of left and right rear lower frame sections are arranged in a lower portion of the rear frame portion so as to extend in the longitudinal direction of the vehicle; a first lower crossmember is arranged between the lower front frame sections and the central lower frame sections so as to extend in a vehicle-widthwise direction, and the lower front frame sections and the central lower frame sections extend substantially in a straight line when viewed in a top view; a second lower crossmember is arranged between the central lower frame sections and the rear lower frame sections so as to extend in a vehicle-widthwise direction, and the rear lower frame sections are arranged in a vehicle-widthwise direction externally of the central lower frame sections; a pair of left and right side frame sections is arranged so as to extend from the front to rear of the vehicle body, each of said side frame sections once bending upward and then bending downward, and is joined at a front end portion to a corresponding one of the lower front frame sections, each of said side frame sections extends toward the longitudinal rearward and externally of the vehicle, is connected to an end of the first lower crossmember and to an end of the second lower crossmember in this order, and is also connected at a rear end thereof to a corresponding one of the rear lower frame sections. The central frame member is joined at a rear end to the second lower crossmember at a position inside of the pair of left and right central lower frame sections.

The present invention according to a seventh aspect thereof is characterized in that rigidity of the lower front frame circular in cross-section is less than rigidity of the central lower frame rectangular in cross-section.

The present invention according to a eighth aspect thereof is characterized in that a front bumper lower attachment portion is arranged below the front bumper so as to be supported by the pair of left and right lower front frame sections. The front bumper lower attachment portion configured to support both the front bumper and the front bumper support pipes. Rigidity of the front bumper lower attachment portion is lower than rigidity of the front bumper support pipes.

The present invention according to a ninth aspect thereof is characterized in that the front bumper support pipes are fastened to the left and right upper frame sections via screws in a longitudinal direction of the vehicle.

The present invention according to a tenth aspect thereof is characterized in that a first upper crossmember extending a vehicle-widthwise direction, and shaped rectangular in cross-section is joined to rear end portions of the upper front frame sections. Rigidity of the first upper crossmember is greater than rigidity of upper front frame sections.

The present invention according to an eleventh aspect thereof is characterized in that a reinforcing member is spanned between one of the central lower frame sections and the second lower crossmember.

The present invention according to a twelfth aspect thereof is characterized in that front elevation pipes are respectively arranged between the lower front frame sections and the front reinforcing pipes; the lower front frame sections, the upper front frame sections, the front reinforcing pipes and the front elevation pipes are disposed so as to surround the front final reducer and a steering box (which converts rotation of a steering shaft into vehicle-widthwise reciprocation), as viewed in a side view. The lower front frame sections are disposed below the front final reducer, as viewed in a side view. The front reinforcing pipes are disposed above the steering box arranged close to a recessed portion provided above an input portion of the front final reducer.

The present invention according to thirteenth aspect thereof is characterized in that a tie-rod extending from the steering box to the front wheel and an upper suspension arm extending from one of the front reinforcing pipes to the front wheel are disposed to overlap each other, as viewed in a front view (as viewed from the front of the vehicle); and an arm bracket as a constituent member of a front wheel suspension arm attachment portion extends downward from the one front reinforcing pipes. A base of the upper suspension arm is joined to the arm bracket.

EFFECTS OF THE INVENTION

According to the first aspect of the present invention, the central frame member substantially extends in a straight line along with the pair of left and right front reinforcing pipes, when viewed in a side view of the vehicle, and the front end portion of the central frame member is joined to the second front cross pipe and the rear end portion of the central frame member is joined to the body frame provided behind the second front cross pipe.

When an impact force is applied to the vehicle body from the front of the vehicle, such impact force is transmitted to the front reinforcing pipe, then to the central frame member via the second front cross pipe joined to the rear end portion of the front reinforcing pipe, and to the remainder of the body frame behind the central frame member.

The central frame member adapted to transmit the impact force applied from the front of the vehicle, to the body frame provided in the rear thereof is disposed at a general center of the body frame, extending in the longitudinal direction of the vehicle, and disposed at a position inside of the joint portions between the pair of left and right front reinforcing pipes and the second front cross pipe. Since the central frame member is arranged generally at central portion of the body frame, the seats or the like can be arranged on the right and left of, i.e., laterally of the central frame member. Since the seat can be arranged on the right and left of the central frame member so as to avoid the central frame member, the vehicle gravity center can be suppressed to a further low level.

Thus, the vehicle body frame structure of the present invention can ensure the vehicle body rigidity and allow the vehicle gravity center to be suppressed to a further lower level. Since the vehicle gravity center can be suppressed to a further lower level, the vehicle maneuverability can be enhanced.

According to the second aspect of the present invention, the rear end portions of the pair of left and right front bumper support pipes are joined to the pair of respective left and right front reinforcing pipes and the front bumper support pipes, the front reinforcing pipes and the central frame member substantially extend in a straight line, as viewed in a side view.

The impact force of the vehicle front applied to the front bumper is transmitted to the front bumper support pipes, then to the pair of left and right front reinforcing pipes joined to the rear ends of the front bumper support pipes, then to the central frame member extending behind the front reinforcing pipes, and to the body frame provided behind the central frame member.

Accordingly, since the front bumper support pipes joined to the front reinforcing pipes are arranged substantially in a straight line along with the central frame member, as viewed in a side view, the impact force can smoothly be transmitted in the axial direction of the above-mentioned members so that the impact force at the vehicle front can reliably be received by the body frame arranged rearward.

According to the third aspect of the present invention, the strength of the vehicle body is such that the front bumper support pipes, the front reinforcing pipes and the central frame member are configured in ascending order of rigidity.

Therefore, the impact force applied from the front of the vehicle is transmitted in this order to the front bumper support pipes, the front reinforcing pipes and the central frame member.

Accordingly, during application of impact force at vehicle's front end, the front bumper support pipe is more bent than the front reinforcing pipes and the front reinforcing pipes are more bent than the central frame member. Thus, the front bumper support pipes provided in front of the central frame member can absorb the large impact force. Since the rigidity of the vehicle front portion is less than that of the vehicle rear portion, the vehicle front portion can reliably absorb the impact force applied from the vehicle front.

According to the fourth aspect of the present invention, the central frame member and the propeller shaft are disposed to overlap each other, as viewed in a side view, to be offset in a vehicle-widthwise direction; therefore, it is possible to avoid the increased height of the vehicle gravity center.

According to the fifth aspect of the present invention, the central frame member and the propeller shaft are housed in the center console (below the center console); therefore, occupant comfort in the living (operating) interior of the vehicle can be enhanced and the external appearance of the living interior can be enhanced.

According to the sixth aspect of the present invention, each of the side frame sections extends from the front to rear of the vehicle body, once bending upward and then bending downward, and is joined at the front end portion to a corresponding one of the lower front frame sections. In addition, the side frame sections extend toward the longitudinal rearward and externally of the vehicle, on the way being connected to the ends of the first lower crossmember and to the ends of the second lower crossmember in this order. The rear ends of the side frame sections are connected to the rear lower frame sections.

With this configuration, the side frame sections, the central frame member and the central lower frame sections sterically form the body frame. Therefore, the low-floor of the center frame portion can be achieved and the predetermined vehicle-body rigidity can be ensured.

Additionally, the rear end of the central frame member is joined to the second lower crossmember extending in a vehicle-widthwise direction. When undergoing the impact force, the second lower crossmember is bent to reliably absorb the impact force transmitted from the central frame member.

According to the seventh aspect of the present invention, the rigidity of the lower front frame is less than that of the central lower frame. The rigidity of the lower front frame which undergoes the impact force before the central lower frame will undergo the impact force is lower than the rigidity of the central lower frame. Accordingly, the lower front frame mainly absorbs the impact force from the front and also the rigidity of the central lower frame portion in which an occupant lives is ensured. Thus, the predetermined impact force can be absorbed while suppressing the weight increase of the vehicle body.

According to the eighth aspect of the present invention, the rigidity of the front bumper lower attachment portion is lower than the rigidity of the front bumper support pipes.

Since the rigidity of the front bumper lower attachment portion is lower than the rigidity of the front bumper support pipes, when the impact force is applied from the front of the vehicle, such impact force applied to the front bumper first disengages the front bumper lower attachment portion, and can be transmitted in the axial direction of the front bumper support pipes. Since the front bumper support pipes are configured to be crushable in the axial direction thereof, they can absorb the predetermined impact force.

According to the ninth aspect of the present invention, the front bumper support pipes are fastened to the left and right upper frame sections via the screws in the longitudinal direction of the vehicle. Thus, it is possible to prevent a shearing force from being applied to the screws fastening the front bumper support pipes when the impact force is applied from the front of the vehicle.

According to the tenth aspect of the present invention, since the first upper crossmember has rigidity greater than rigidity of upper front frame sections, when the impact force is applied from the front of the vehicle, the upper front frame sections are bent to undergo the impact force. The first upper crossmember having a greater rigidity supports the upper front frame sections and the upper front frame sections are configured to bend when the impact force is applied thereto. Thus, the ensuring of vehicle rigidity and the ensuring of impact absorbing performance can be balanced with each other.

According to the eleventh aspect of the present invention, the reinforcing members are spanned between the central lower frame sections and the second lower crossmember.

The impact force applied from the central lower frame sections is partially distributed and transmitted to the second lower crossmember via the reinforcing members. Thus, the rigidity of the body frame can be enhanced effectively.

According to the twelfth aspect of the present invention, the front final reducer and the steering box are disposed in the area surrounded by the lower front frame sections, the upper front frame sections, the front reinforcing pipes and the front elevation pipes. In addition, the front reinforcing pipes are disposed above the steering box arranged close to the recessed portion provided above the input portion of the front final reducer.

Since the front final reducer and the steering box are centrally arranged in the lower portion of the front frame portion, the gravity center of the vehicle can be lowered and the saving of the arrangement space can be achieved. Additionally, the frame structure can protect the front final reducer and the steering box.

According to the thirteenth aspect of the present invention, the tie-rod extending from the steering box to the front wheel and the upper suspension arm extending from the front reinforcing pipe to the front wheel are arranged to overlap each other as viewed from the front of the vehicle. In addition, the arm bracket is extended below from the front reinforcing pipe and the base of the upper suspension arm is joined to the arm bracket.

If the tie-rod and the upper suspension arm are not arranged to overlap each other as viewed from the front of the vehicle, a difference between a distance between left and right wheel front ends and a distance between left and right wheel rear ends (toe-in) may be increased in some cases.

In this regard, according to the present invention, the tie-rod overlaps the upper suspension arm as viewed from the front of the vehicle. Therefore, a variation in the toe-in of the front wheel can be suppressed.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIGS. 8A-8B are views of the frame structure of the vehicle according to the embodiment of the present invention and a view of a comparative example.

DETAILED DESCRIPTION OF ILLUSTRATIVE EMBODIMENTS

Figure 1:
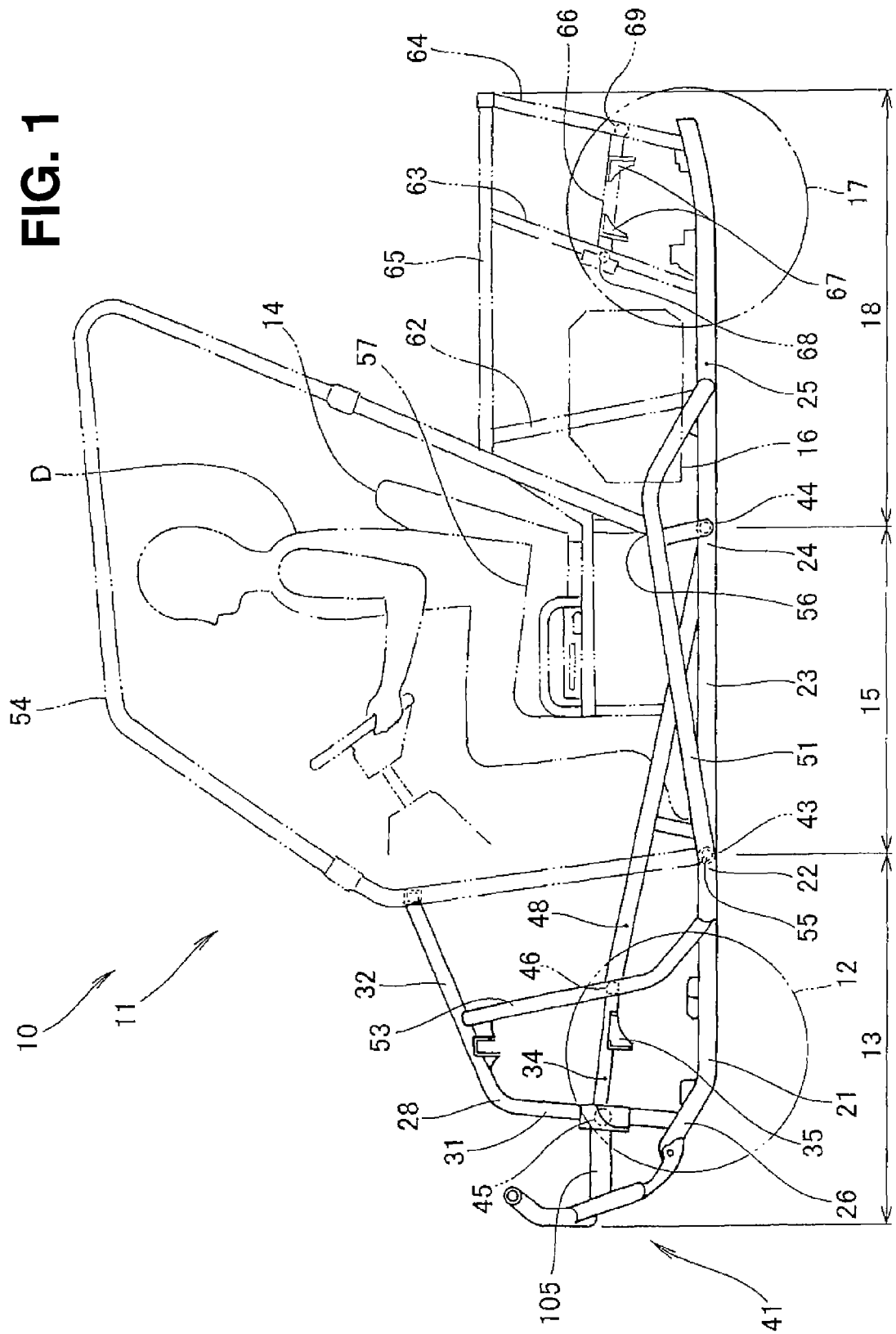
FIG. 1 is a left lateral view of a vehicle frame structure according to the present invention.

Illustrative embodiments of the present invention will now be described, with reference to the drawings. Throughout the disclosure, relative terms like "upper", "lower", "above", "below", "front", "back", and the like are used in reference to a vantage point of an operator of the vehicle, seated on the driver's seat and facing forward.
In other words, in the drawings and illustrative embodiments, relative positional terms such as "up" "down," "front," "rear," "left" and "right" represent respective directions a driver getting in a vehicle looks. It should be understood that these terms are used for purposes of illustration, and are not intended to limit the invention. It is intended that the drawings should be viewed based on the orientation of reference numerals.

An illustrative embodiment of the present invention is described below with reference to the drawings.

First, a description of an overall structure of a body frame 11 is provided herein.

Referring to FIG. 1, a vehicle 10 of the present invention includes the body frame 11. The body frame 11 is divided into three portions, including a front frame portion 13 for suspending the front wheels 12; a center frame portion 15 provided behind the front frame portion 13, for defining an occupying space (living space) provided with a seat 14 on which an occupants sits; and a rear frame portion 18, provided behind the center frame portion 15, for supporting an engine 16 and rear wheels 17.

Next, a description is given with a specific focus on a floor portion which provides a base of the body frame 11.

The body frame 11 (frame 11) of the vehicle is arranged such that lower front frame sections 21 (21L, 21R) extend in a longitudinal direction of the vehicle. Central lower frame sections 23 (23L, 23R) extend rearwardly from respective rear end portions 22 of the lower front frame sections 21. In similar fashion, rear lower frame sections 25 extend rearwardly from the corresponding rear end portions 24 of the central lower frame sections.

Upper front frame sections 28, which are joined to corresponding to front end portions 26 of the lower front frame sections 21, extend upward for a fixed distance and then bend towards the rear and extends substantially in the longitudinal direction of the vehicle 10. The upper front frame sections 28, which serve as constituent members of the front frame portion 13, are each composed of a substantially vertical portion 31 and a slant portion 32 ramping differently from and extending from the substantially vertical portion 31 toward the rear of the vehicle 10.

At each side of the vehicle, a front reinforcing pipe 34 is joined at a front end thereof to the substantially vertical portion 31 of the upper front frame, and the front reinforcing pipe 34 extends substantially in the longitudinal direction of the vehicle. The front reinforcing pipe 34 is a frame member having a front wheel suspension arm attachment portion 35 thereon.

The front reinforcing pipes 34 are disposed above the corresponding lower front frame sections 21 in a manner so that the front portion of the body frame 11 has a two-stage structure formed of the front reinforcing pipes 34 and the lower front frame sections 21.

A front bumper 41 is disposed at the front ends of the front reinforcing pipes 34. The details of the front bumper 41 are discussed later.

Figure 2:
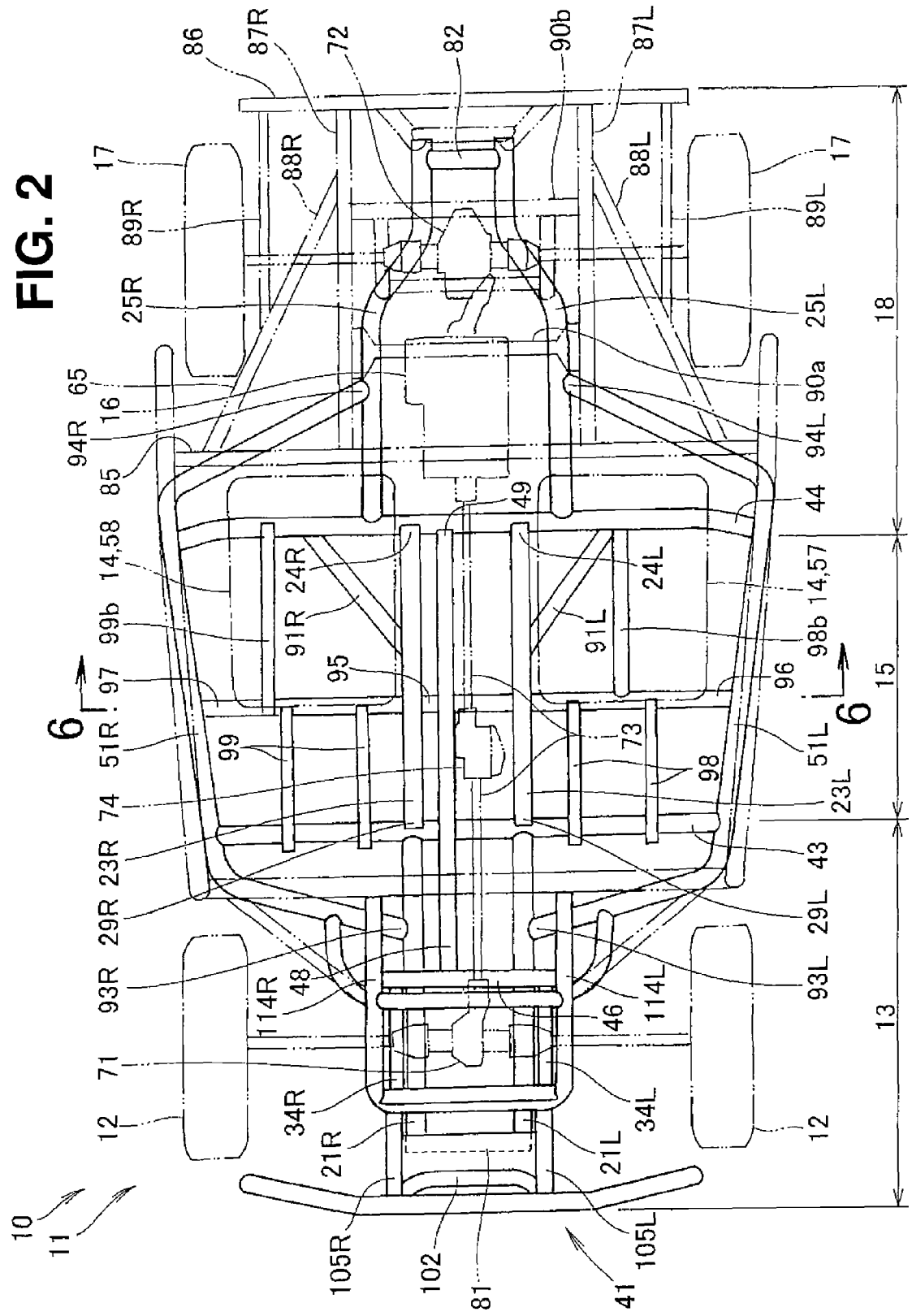
FIG. 2 is a plan view of the vehicle frame structure according to the present invention.

As shown in FIG. 2, a first lower crossmember 43 extends in a vehicle-widthwise direction between the lower front frame sections 21L, 21R and the central lower frame sections 23L, 23R. A second lower crossmember 44 extends in a vehicle-widthwise direction between the central lower frame sections 23L, 23R and the rear lower frame sections 25L, 25R. Both the first and second lower crossmember sections 43, 44 are frame members interposed between the corresponding lower frame sections.

The first lower crossmember 43 is a frame member dividing the front frame portion 13 from the center frame portion 15. The second lower crossmember 44 is a frame member dividing the center frame portion 15 from the rear frame portion 18.

A driver's seat 57, configured to be occupied by a driver D sitting thereon, is disposed between the first and second lower crossmembers 43, 44, as shown.

Figure 3:
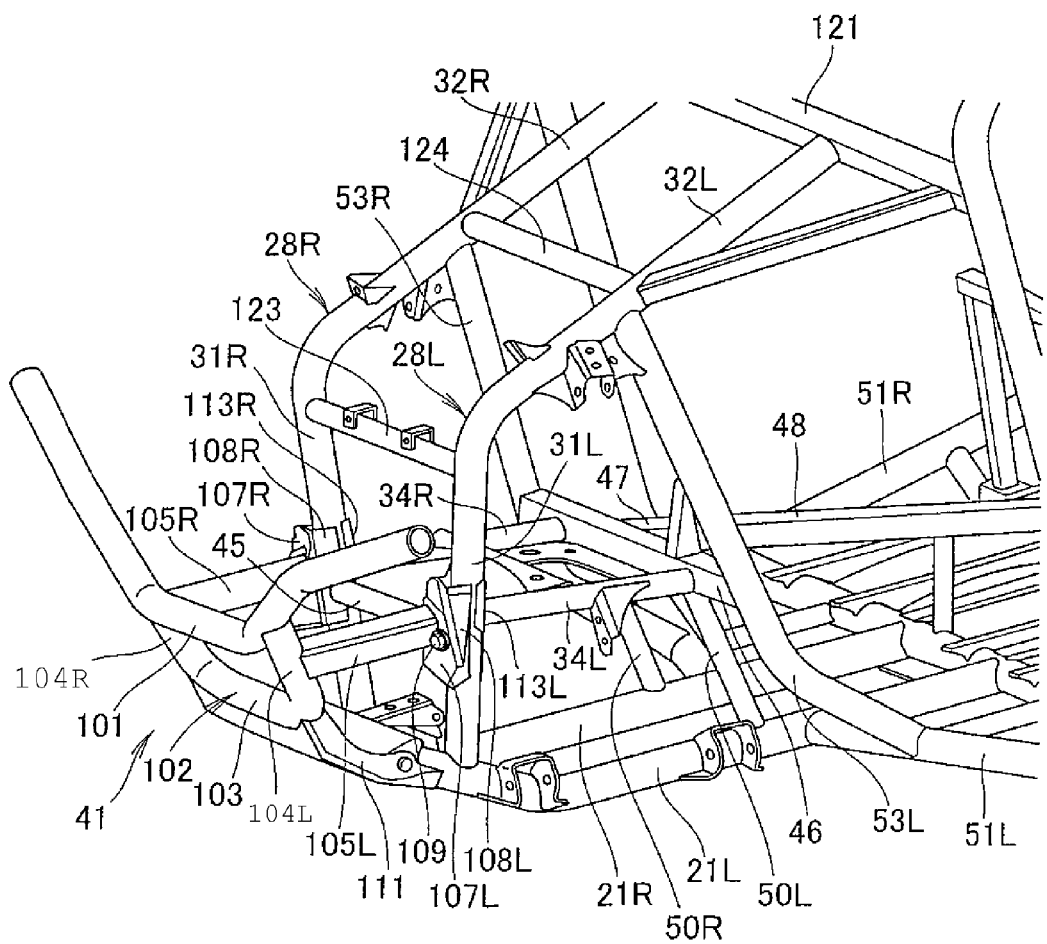
FIG. 3 is a perspective view of a front frame portion of a vehicle frame structure according to the present invention.

Next, a description of the front frame portion 13 of the vehicle 10 is given, with reference to FIG. 3.

A first front cross pipe 45 extends in a vehicle-widthwise direction at front ends of the front reinforcing pipes 34L, 34R. A second front cross pipe 46 extends in a vehicle-widthwise direction at rear ends of the front reinforcing pipes 34L, 34R. A left front elevation pipe 50L is spanned between the second front cross pipe 46 and the left lower front frame 21L. A right front elevation pipe 50R is spanned between the second front cross pipe 46 and the lower right front frame section 21R.

The front bumper 41 includes an arm portion 101 extending left and right, and a U-shaped portion 102 extending downward from the arm portion 101. The U-shaped portion 102 is substantially U-shaped, as viewed from the front of the vehicle. The U-shaped portion 102 includes a horizontal portion 103 and left and right upstanding portions 104L, 104R extending upward respectively from left and right end portions of the horizontal portion 103. A pair of left and right front bumper support pipes 105L and 105R extend rearwardly from the left and right upstanding portions 104L and 104R, respectively.

The front bumper support pipes are formed with respective flange portions 107L, 107R at rear end portions thereof. Seat portions 108L and 108R corresponding to the flange portions 107L and 107R are formed on upward upstanding portions 31L and 31R of the upper front frame sections, respectively. The flange portions 107L and 107R are fastened to the seat portions 108L and 108R, respectively, by using a plurality of screws 109.

A front bumper lower attachment portion 111 formed by bending a thin plate is secured to the horizontal portion 103 of the U-shaped portion 102. The front bumper lower attachment portion 111 is attached to distal ends of the pair of left and right lower front frame sections 21L, 21R. The rigidity of the front bumper lower attachment portion 111 is set at a value smaller than rigidity of the front bumper support pipes 105L, 105R.

A configuration of the front bumper 41 is summarized below.

The front bumper 41 is mounted to the front end portion of the vehicle body. The pair of front bumper support pipes 105L, 105R extend rearward from the front bumper 41. The pair of left and right front bumper support pipes 105L and 105R are joined to the pair of left and right upper front frame sections 28L and 28R, respectively. The pair of left and right front bumper support pipes 105L and 105R are respectively joined to joint portions 113L and 113R each between a corresponding one of the pair of left and right front reinforcing pipes 34L, 34R and a corresponding one of the pair of left and right upper front frame sections 28L, 28R.

The front bumper lower attachment portion 111 is arranged below the front bumper 41 so as to be supported by the pair of left and right lower front frame sections 21L, 21R, and to support both the front bumper 41 and the front bumper support pipes 105L, 105R. The front bumper support pipes 105L, 105R are fastened to the vehicle body by using the screws 109 in the longitudinal direction of the vehicle.

A central frame member 48 is spanned between the second front cross pipe 46 and the second lower crossmember 44 (FIG. 2) so as to undergo an impact force applied from the front of the vehicle 10. The central frame member 48 is a linearly formed member extending obliquely downward toward the behind the vehicle 10. The details of the central frame member 48 are described later.

A description of the structure of the overall body frame is given below.

Figure 4:
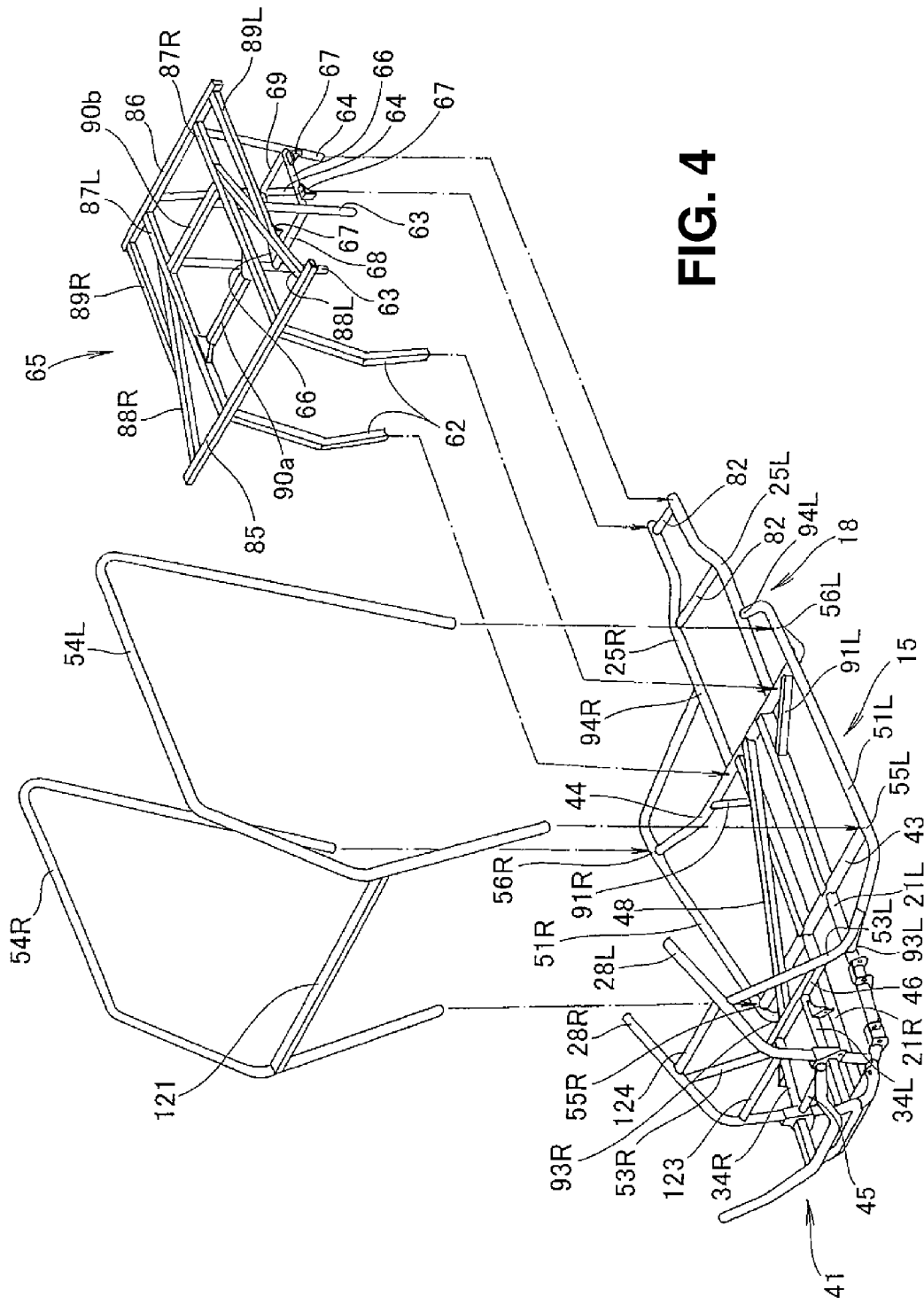
FIG. 4 is an exploded perspective view of the frame structure of the vehicle according to the present invention.

As shown in FIG. 4, side frame sections 51L and 51R extend outwardly from the intermediate portions of the lower front frame sections 21L and 21R to the intermediate portions of the rear lower frame sections 25L and 25R, respectively, in a vehicle-widthwise direction, then extend in a vehicle-longitudinal direction, and lastly extend inwardly in a vehicle-widthwise direction. First erection frame sections 53L and 53R extend upwardly from the front portions of the side frame sections 51L and 51R, respectively, and are joined at upper ends thereof to the upper front frame sections 28L and 28R, respectively.

Roll bars 54L, 54R, each having substantially U-shaped profile, when viewed in a side view, are respectively provided to extend from the front portions to rear portions of the side frame sections 51L, 51R to define the occupant's living space. The roll bars 54L, 54R are members extending upward from respective joint portions 55L, 55R, as start points, with the first lower crossmember 43, the joint portions 55L and 55R being included in the side frame sections 51L and 51R, respectively. Then, the members (roll bars 54L, 54R) extend horizontally rearward, lastly extending downward, and terminate at joint portions 56L, 56R with the second lower crossmember 44, the joint portions 56L and 56R being included in the side frame sections 51L and 51R, respectively.

With additional reference to FIG. 1, the pair of left and right side frame sections 51L, 51R extend from the front to rear of the vehicle, once bending upward and then downward. The left and right side frame sections 51L and 51R are joined to the lower front frame sections 21L and 21R at front end portions 93L and 93R, respectively. The left and right side frame sections 51L, 51R extend longitudinally rearward on the outside of the vehicle, and subsequently, on the way are joined to ends of the first lower crossmember 43 and ends of the second lower crossmember 44 in this order. In addition, the left and right side frame sections 51L and 51R are joined to the pair of rear lower frame sections 25L and 25R at rear end portions 94L and 94R, respectively.

A description of a configuration of the rear frame portion 18 is given below.

Second erection frame sections 62, 62, third erection frame sections 63, 63 and fourth erection frame sections 64, 64 are provided from the front to the rear in this order on the corresponding rear lower frame sections 25L, 25R. A rear top frame 65 composed of a plurality of members is mounted on the respective upper ends of the second, third and fourth erection frame sections 62, 63, 64.

Rear reinforcing pipes 66, 66 are each spanned in the longitudinal direction of the vehicle between a corresponding one of intermediate portions of the third erection frame sections 63, 63 and a corresponding one of intermediate portions of the fourth erection frame sections 64, 64. A first rear crossmember 68 is spanned in a vehicle-widthwise direction between respective front ends of the rear reinforcing pipes 66, 66. A second rear crossmember 69 is spanned in a vehicle-widthwise direction between respective rear ends of the rear reinforcing pipes 66, 66. The rear reinforcing pipes 66, 66 are frame members having respective rear wheel suspension arm attachment portions 67, 67.

The rear top frame 65 includes a front rear cross pipe 85, an aft rear cross pipe 86, and left and right rear upper frame sections 87L, 87R, as main constituent elements. The front rear cross pipe 85 attached to the upper ends of the second erection frame sections 62, 62, extend in a vehicle-widthwise direction, and is joined to the respective roll bars 54 at both corresponding end portions.

The aft rear cross pipe 86 is provided behind the front rear cross pipe 85. The aft rear cross pipe 86 extends vehicle-widthwise, and is attached to the upper ends of the fourth erection frame sections 64. The left and right rear upper frame sections 87L, 87R are spanned between the aft rear cross pipe 86 and the front rear cross pipe 85. A plurality of reinforcing frame sections 88L, 88R, 89L, 89R, 90a, 90b are provided as reinforcing members for increasing joint strength among the front rear cross pipe 85, the aft rear cross pipe 86 and the left and right rear upper frame sections 87L, 87R.

Next, a description of vehicle components such as an engine and the like mounted on the body frame 11 is given.

Returning to FIG. 2, as discussed above, the body frame 11 mainly includes three portions: the front frame portion 13, the center frame portion 15 and the rear frame portion 18. A front final reducer 71 operable to drive the front wheels 12, 12 is mounted on the front frame portion 13. The driver's seat 57 and an occupant seat 58 provided as the seat 14 on which occupants sit are mounted on the center frame portion 15. The driver's seat 57 and the occupant seat 58 are arranged parallel to each other in a vehicle-width direction. The engine 16 and a rear final reducer 72, as a drive system of the rear wheels 17, 17, are mounted on the rear frame portion 18.

A propeller shaft 73 is disposed in a vehicle-body-widthwise centerline for transmitting the drive force of the engine 16 to the front final reducer 71. A change unit 74 is arranged between the engine 16 and the front final reducer 71.

A lower-bumper crossmember 81 is spanned between front ends of the left and right lower front frame sections 21L, 21R. The first lower crossmember 43 is provided so as to be joined to the rear ends of the left and right lower front frame sections 21L, 21R and extend in a vehicle-widthwise direction. The second lower crossmember 44 is arranged behind the first lower crossmember 43 so as to extend in the vehicle-widthwise direction similarly to the first lower crossmember 43.

Respective front end portions 29L, 29R of the pair of left and right central lower frame sections 23L, 23R are joined to the first lower crossmember 43. Respective rear end portions 24L, 24R of the pair of left and right central lower frame sections 23L, 23R are joined to the second lower crossmember 44.

The pair of rear lower frame sections 25L, 25R are arranged so as to extend rearward in a longitudinal direction of the vehicle from the second lower crossmember 44. A sub-rear cross member 82 is spanned between the left and right rear lower frame sections 25L, 25R.

The pair of left and right central lower frame sections 23L, 23R are arranged at the lower portion of the center frame portion 15 so as to extend in a longitudinal direction of the vehicle. The pair of left and right rear lower frame sections 25L, 25R are arranged at the lower portion of the rear frame portion 18 so as to extend in a longitudinal direction of the vehicle. The first lower crossmember 43 is provided between the lower front frame sections 21 and the central lower frame sections 23L, 23R so as to extend in a vehicle-widthwise direction. The lower front frame sections 21L, 21R and the central lower frame sections 23L, 23R extend substantially in a straight line, when viewed from above. The second lower crossmember 44 is arranged between the central lower frame sections 23L, 23R and the rear lower frame sections 25L, 25R so as to extend in a vehicle-widthwise direction.

The rear lower frame sections 25L, 25R are provided in a vehicle-widthwise direction outwardly of the central lower frame sections 23L, 23R. The central frame member 48 is disposed at a position inside of the joint portions 114L, 114R each between a corresponding one of the pair of left and right front reinforcing pipes 34L, 34R and the second front cross pipe 46.

The rear end portion 49 of the central frame member is joined to the second lower crossmember 44 at a position inside of the pair of left and right central lower frame sections 23L, 23R. Reinforcing members 91L, 91R are each spanned between a corresponding one of the central lower frame sections 23L, 23R and the second lower crossmember 44. With such reinforcing members 91L, 91R, an impact force applied from the central lower frame sections 23L, 23R is partially distributed and transmitted to the second lower crossmember 44 via the reinforcing members 91L, 91R. Thus, impact absorbing performance can be enhanced.

Returning to FIG. 2, a center sub-crossmember 95 is disposed in the center frame portion 15, and between the first lower crossmember 43 and the second lower crossmember 44 and behind the first lower crossmember 43 so as to be spanned in vehicle-widthwise direction. Similarly, a left sub-crossmember 96 is spanned between the left central lower frame 23L, and the left side frame 51L is spanned in a vehicle-widthwise direction. In addition, a right sub-crossmember 97 is spanned between the right central lower frame 23R and the right side frame 51R in the vehicle-width direction.

Sub-frame sections 98, 98 are spanned between the first lower crossmember 43 and the left sub-crossmember 96 in the longitudinal direction of the vehicle. In addition, sub-frame sections 99, 99 are spanned between the left sub-crossmember 96 and the second lower crossmember 44 in the longitudinal direction of the vehicle.

A second sub-frame 98b is spanned between the left sub-crossmember 96 and the second lower crossmember 44 in the longitudinal direction of the vehicle. In addition, a second sub-frame 99b is spanned between the right sub-crossmember 97 and the second lower crossmember 44 in the longitudinal direction of the vehicle.

Returning to FIG. 1, the front reinforcing pipe 34 is joined to a portion of the upper front frame 28 on a side opposite the seat portion 108L, 108R (FIG. 3) at which the upper front frame 28 is provided. Accordingly, the front reinforcing pipe 34 and the front bumper support pipe 105 are arranged in a generally straight line when viewed in a side view.

A detailed description of a structure of the central frame member 48, which has a front end portion thereof joined to the rear ends of the pair of left and right front reinforcing pipes 34 and a rear end portion thereof joined to the second front cross pipe 46 extending in a vehicle-widthwise direction and to which the impact force received by the front bumper 41 is transmitted, is given below.

Referring to FIGS. 2 and 3, the central frame member 48 is a frame member rectangular in cross-section extending in the longitudinal direction of the vehicle along a general center of the body frame 11. The central frame member 48 has a front end portion 47 joined to the second front cross pipe 46 and a rear end portion 49 joined to the second lower crossmember 44 provided behind the second front cross pipe 46. The central frame member 48 is disposed so as to be offset leftward, as viewed from above, from the widthwise centerline of the vehicle body. Also, it is reasonable to interpreter that the central frame member 48 may be disposed to be offset rightward from the widthwise centerline of the vehicle body.

The front end portion 47 of the central frame member is joined to the second front cross pipe 46 at a position inside the joint portions 114L, 114R each between a corresponding one of the pair of left and right front reinforcing pipes 34L, 34R and the second front cross pipe 46.

Also, in the illustrative embodiment, although the rear end portion 49 of the central frame member is joined to the second lower crossmember 44, it is reasonable to interpret that the rear end portion 49 may be joined to any frame if such a frame is provided behind the second front cross pipe 46. For example, a cross pipe may be spanned in vehicle-widthwise direction and behind the second front cross pipe 46, and the rear end portion 49 of the central frame member may be joined to the cross pipe 46.

With additional reference to FIG. 1, the central frame member 48 extends in a generally straight line along with the pair of left and right front reinforcing pipes 34 when viewed in a side view. The front bumper support pipes 105, the front reinforcing pipes 34 and the central frame member 48 extend in a straight line.

As shown in FIG. 3, the first front cross pipe 45 is spanned between the upward upstanding portions 31L, 31R of the pair of left and right upper front frame sections corresponding respectively to the front ends of the pair of left and right front reinforcing pipes 34, in the vicinity of the joint portions of the front ends of the pair of front reinforcing pipes 34L, 34R. The second front cross pipe 46 is provided between the rear portions of the front reinforcing pipes 34L, 34R so as to connect the front reinforcing pipes 34L, 34R together. Both ends of the second front cross pipe 46 are joined to the corresponding left and right first erection frame sections 53L, 53R.

A first sub-crossmember 123 and a second sub-crossmember 124 are each spanned between the left and right first erection frame sections 53L, 53R at intermediate portions of the left and right first erection frame sections 53L, 53R. Incidentally, the left and right first erection frame sections 53L, 53R are joined at their upper ends to corresponding slant portions 32L, 32R of the upper front frame sections.

Figure 5:
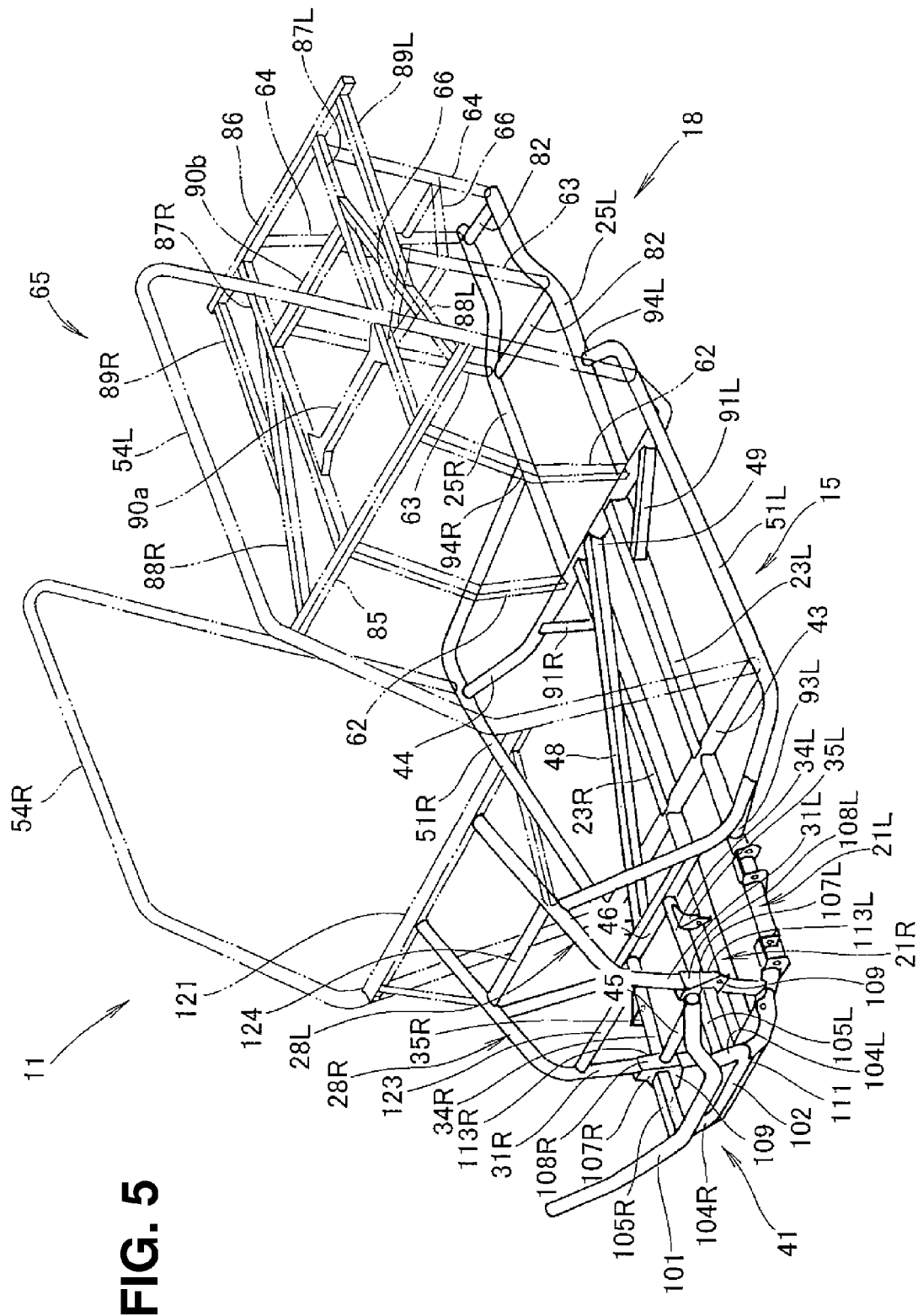
FIG. 5 is a perspective view of the frame structure of the vehicle according to the present invention.

Referring to FIG. 5, the left and right roll bars 54L, 54R are mounted from above in the center frame portion 15 and the rear top frame 65 united with the second, third and fourth erection frame sections 62, 63, 64 are mounted from above in the rear frame portion 18.

A description of a body frame structure, in which the roll bars 54L, 54R are mounted in the center frame portion 15 and the rear top frame 65 composed of a plurality of members are mounted in the rear frame portion 18, is given below.

The body frame 11 includes the pair of left and right lower front frame sections 21L, 21R extending in the longitudinal direction of the vehicle and in the lower portion of the vehicle body; and the pair of left and right upper front frame sections 28L, 28R joined to the corresponding front end portions of the lower front frame sections 21L 21R, once extending upward, bending rearwardly, and extending in the longitudinal direction of the vehicle.

The body frame 11 further includes the pair of left and right front reinforcing pipes 34L, 34R joined to the respective upper front frame sections 28L, 28R, extending in the longitudinal direction of the vehicle, and having respective front wheel suspension arm attachment portions 35L, 35R; the first front cross pipe 45 joining together the front portions of the front reinforcing pipes 34L, 34R; and the second front cross pipe 46 joining together the rear portions of the front reinforcing pipes 34L, 34R.

A first upper crossmember 121 extending vehicle-widthwise and shaped rectangular in cross-section are joined to the rear end portions of the upper front frame sections 28L, 28R.

A description of rigidity the various frame members of the body frame 11 is given below.

The rigidity of the front bumper support pipes 105L, 105R is less than the rigidity of the front reinforcing pipe 34 shaped circular in cross-section. In addition, the rigidity of the front reinforcing pipe 34 is less than the rigidity of the central frame member 48 shaped rectangular in cross-section.

The rigidity of the lower front frame 21 shaped circular in cross-section is less than the rigidity of the central lower frame sections 23L, 23R shaped rectangular in cross-section.

The rigidity of the lower front frame sections 21L, 21R is less than the rigidity of the central lower frame sections 23L, 23R. The rigidity of front frame portion 13 first undergoing an impact force is less than that of the central frame member portion 15 for absorbing the impact force from the front and for ensuring the rigidity of the central frame member portion 15 in which the seat 14 including the occupant seat 58 and the driver's seat 57 are arranged. Such configuration ensures predetermined impact absorbing performance while suppressing the weight increase of the vehicle body.

As described above, the side frame sections 51L and 51R once bend upward from the front to rear of the vehicle body, then bending downward, and are joined to the lower front frame sections 21L and 21R at their front end portions 93L and 93R, respectively. In addition, the left and right side frame sections 51L, 51R extend longitudinally rearward on the outside of the vehicle, and subsequently, on the way are joined to ends of the first lower crossmember 43 and ends of the second lower crossmember 44 in this order. Thereafter, the left and right side frame sections 51L and 51R are joined to the rear lower frame sections 25L and 25R at rear end portions 94L and 94R, respectively.

The side frame sections 51L, 94R, the central frame member 48 and the central lower frame sections 23L, 23R are sterically formed. Therefore, while the central frame member portion 15 is made as a low-floor, the predetermined rigidity of the vehicle body can be ensured.

Additionally, the rear end portion 49 of the central frame member is joined to the second lower crossmember 44. At the time of undergoing an impact force, the second lower crossmember 44 is bent to absorb the impact force transmitted from the central frame member 48.

A description of the central frame member and a propeller shaft passing between the driver's seat and the passenger seat and of a center console covering the central frame member and the propeller shaft is given below.

Figure 6:
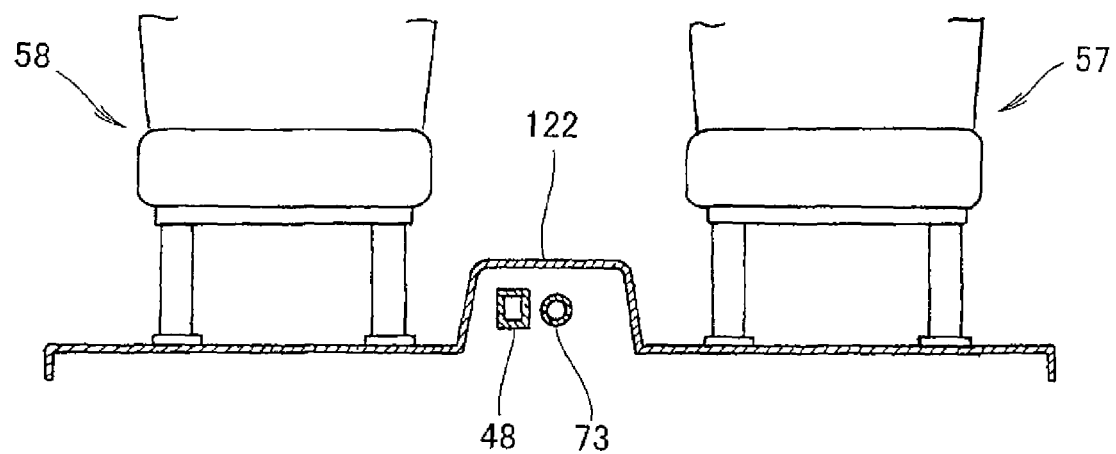
FIG. 6 is a cross-sectional view taken along line 6-6 of FIG. 2.

Referring to FIG. 6, a center console 122 housing therebelow the central frame member 48 and the propeller shaft 73 is disposed between the driver's seat 57 and the occupant seat 58. Since the central frame member 48 and the propeller shaft 73 are housed in the center console 122, occupant comfort in a vehicle interior can be enhanced and external appearance in the vehicle interior can be enhanced.

Next, a description of function of the frame structure of the vehicle described above, is given below.

Figure 7A:
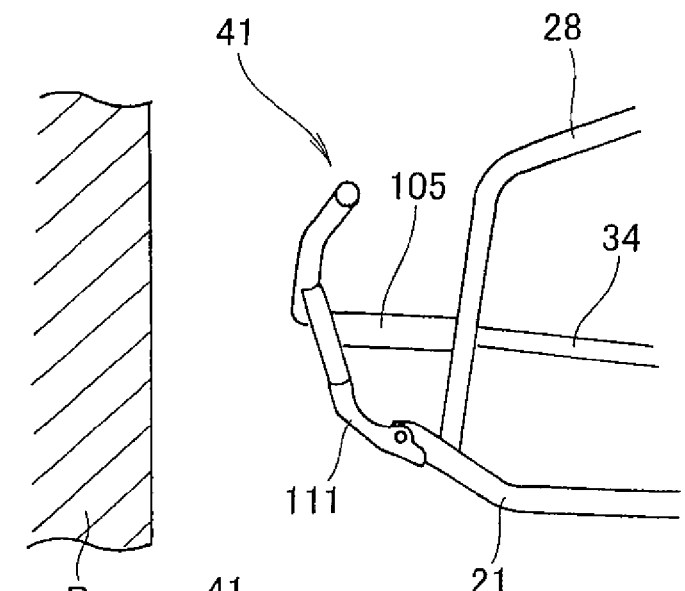
FIGS. 7A-7C are views for explaining operation encountered when a front bumper undergoes an impact force.

FIG. 7A illustrates a state before the front bumper 41 provided at the front end portion of the vehicle about to come into contact with an obstruction B. The rigidity of the front bumper lower attachment portion 111 is less than the rigidity of the front bumper support pipe 105.

Figure 7B:
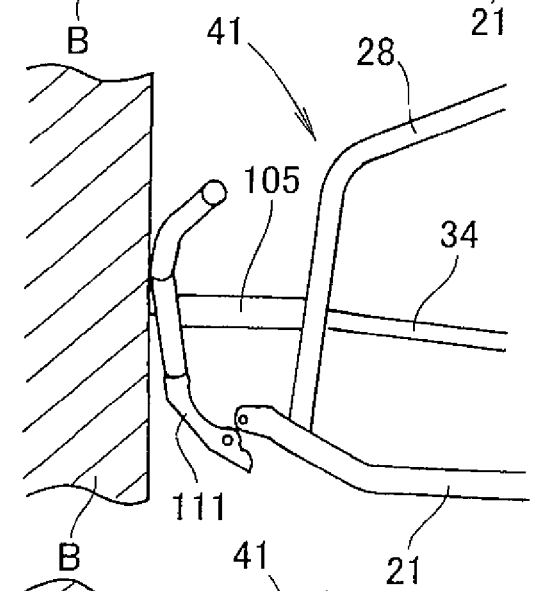

FIG. 7B illustrates a state immediately after the front bumper 41 has come into contact with the obstruction B. In this case, since the rigidity of the front bumper lower attachment portion 111 is low, the front bumper lower attachment portion 111 is disengaged from the distal end of the lower front frame 21 when a predetermined impact force is applied to the front bumper 41. Since the front bumper lower attachment portion 111 is disengaged, the impact force is transmitted in the axial direction of the front bumper support pipe 105.

In other words, since the rigidity of the front bumper lower attachment portion 111 is less than the rigidity of the front bumper support pipes 105L, 105R, the front bumper lower attachment portion 111 is broken when a predetermined impact force is applied. Thus, the impact force can be transmitted in the axial direction of the front bumper support pipes 105L, 105R. In addition, the front bumper support pipes 105L, 105R are made axially crushable so that the predetermined impact absorbing performance can be ensured.

Figure 7C:
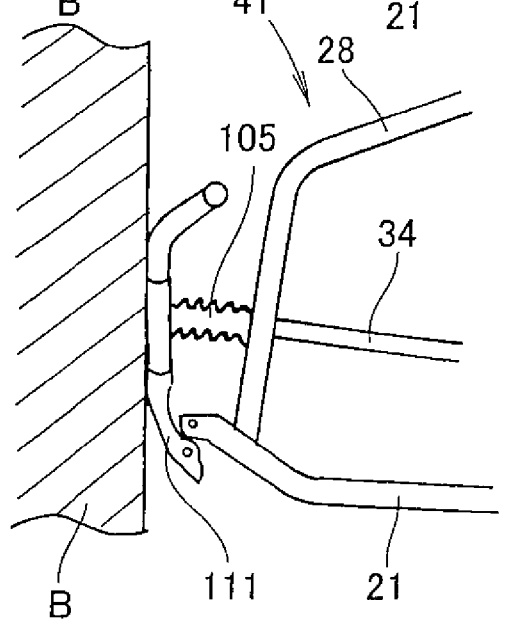

FIG. 7C illustrates a state after the front bumper 41 has come into contact with the obstruction B and the front bumper lower attachment portion 111 has be disengaged.

After the front bumper lower attachment portion has been disengaged, the impact force is transmitted in the axial direction of the front bumper support pipe 105. Consequently, the front bumper support pipe 105 is axially crushed. The mechanism described above is designed to absorb the predetermined impact force.

Returning to FIG. 5, the first upper crossmember 121 shaped rectangle in cross-section and extending in vehicle-widthwise direction is joined to the rear end portions of the upper front frame sections 28L, 28R. The rigidity of the first upper crossmember 121 is greater than that of the upper front frame sections 28.

When undergoing the impact force from the front of the vehicle, the upper front frame 28 is bent to undergo the impact force because the rigidity of the first upper crossmember 121 is greater than that of the upper front frame 28. The first upper crossmember 121 having the greater rigidity supports the upper front frame 28 and the upper front frame 28 is bent when undergoing the impact force. Accordingly, the ensuring of vehicle rigidity and the ensuring of impact absorbing performance can be balanced with each other.

Additionally, the front bumper support pipes 105L, 105R are fastened to the vehicle body in the longitudinal direction of the vehicle by means of a plurality of screws 109 (FIG. 3). With such a configuration, when the impact force is applied from the front of the vehicle, it is possible to prevent a shearing force from being applied to the screws 109 used to fasten the front bumper support pipes 105L, 105R.

Returning to FIG. 1, the central frame member 48 extends in a generally straight line along with the left and right front reinforcing pipes 34. The front end portion 47 (FIG. 2) of the central frame member is joined to the second front cross pipe 46. In addition, the rear end portion 49 (FIG. 2) of the central frame member 48 is joined to the second lower crossmember 44 provided behind the second front cross pipe 46.

The impact force applied from the front of the vehicle to the front bumper 41 is transmitted to the front bumper support pipes 105L, 105R, and to the pair of left and right front reinforcing pipes 34L, 34R joined respectively to the rear end portions of the front bumper support pipes 105L, 105R. Further, the impact force is transmitted to the central frame member 48 extending behind the front reinforcing pipes 34L, 34R and to the second lower crossmember 44 provided behind the central frame member 48 as the body frame.

The front bumper support pipes 105L, 105R connected to the respective front reinforcing pipes 34 are disposed in a straight line along with the central frame member 48 as viewed from the side of the vehicle. Therefore, the impact force can be transmitted in the axial direction of each member and the impact force at the front of the vehicle can reliably be received by the second lower crossmember 44 provided at the rear thereof.

Regarding the relative strengths of the frame sections of the vehicle body, the front bumper support pipes 105L, 105R, the front reinforcing pipe 34 and the central frame member 48 are configured in ascending order of rigidity. The impact force applied from the front of the vehicle is transmitted to the front bumper support pipes 105L, 105R, the front reinforcing pipes 34 and the central frame member 48 in this order. The front bumper 41 can undergo a larger impact force than the central frame member 48. Thus, the front portion of the vehicle can reliably undergo an impact force applied thereto.

FIG. 8A illustrates the embodiment according to the present invention, in which the central frame member 48 transmitting the impact force applied from the front of the vehicle is disposed in the general center of the body frame 11 and extends in a longitudinal direction of the vehicle 10.

FIG. 8B illustrates a comparative example. In order to secure predetermined vehicle-body rigidity for an impact force applied from the front of a vehicle, the vehicle frame structure shown in the comparative example needs an upper-lower two-step structure having a sub-frame 87B and a lower side frame 51B as viewed from the side of the vehicle body. Therefore, in the comparative example, it is necessary to increase the height of a foot rest surface 116B on which vehicle occupant's feet are put, by an amount such as, for example, that shown at Δh. The increased height of the foot rest surface 116B increases the height of the gravity center of the vehicle, leading to problematic operability of the vehicle.

In this regard, according to the present invention, the central frame member 48 is disposed in the general center of the body frame 11 and extends in the longitudinal direction of the vehicle.

With additional reference to FIG. 2, the central frame member 48 is located inside the joint portions 114L, 114R each between a corresponding one of the pair of left and right front reinforcing pipes 34L, 34R and the second front cross pipe 46.

Such configuration makes it possible to arrange the seat on the left and right of, i.e., laterally of the central frame member 48. Since the seat 14 can be arranged regardless of the central frame member 48, the gravity center of the vehicle can be further suppressed to a low level as illustrated in FIG. 8A.

Thus, the vehicle frame structure of the present invention can achieve a balance between the ensuring of vehicle body rigidity and the lowering of the vehicle gravity center. Since the vehicle gravity center can further be suppressed to a low level, the vehicle operability can be enhanced.

As shown in FIG. 6, the central frame member 48 and the propeller shaft 73 are arranged to overlap each other, as viewed from the side of the vehicle, and to be offset from each other a vehicle-widthwise direction. Thus, there is no concern about the increased vehicle gravity center.

A description of a body frame structure arranged to surround the front final reducer and a steering box disposed in the vehicle front portion is given below.

Figure 9:
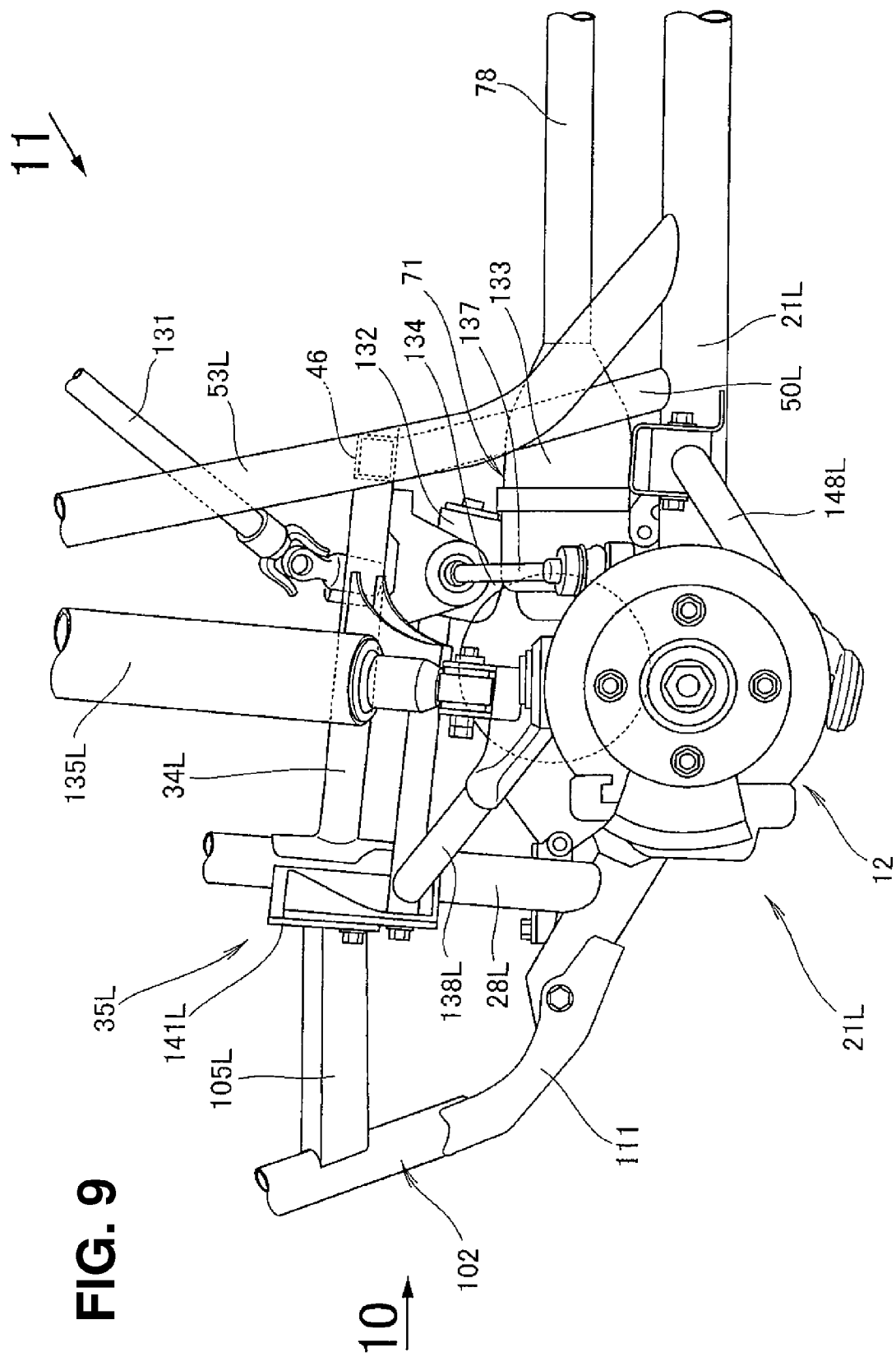
FIG. 9 is a left lateral view of a front frame portion of the vehicle according to the present invention.

Referring to FIG. 9, the front elevation pipe 50L is provided between the lower front frame 21L and the front reinforcing pipe 34L. The lower front frame 21L, the upper front frame 28L, the front reinforcing pipe 34L and the front elevation pipe 50L are arranged to surround the front final reducer 71 and the steering box 132, as viewed in a side view. The steering box 132 converts the rotation of the steering shaft 131 into vehicle-widthwise reciprocation. The lower front frame 21L is disposed below the front final reducer 71, as viewed in a side view. The front reinforcing pipe 34L is disposed above the steering box 132 disposed close to a recessed portion 134 provided above an input portion 133 of the front final reducer.

The lower front frame 21R, the upper front frame 28R, the front reinforcing pipe 34R and the front elevation pipe 50R constituting the right side of the vehicle body are configured similarly to the frame group constituting the left side of the vehicle body. Therefore, their explanations are omitted. The vehicle 10 includes a front suspension 135L.

The front final reducer 71 and the steering box 132 are centrally arranged in the lower portion of the front frame portions 21L, 21R. Therefore, lowering of the vehicle gravity center can be achieved and saving of the arrangement space can be achieved. Additionally, the frame structure described above can protect the front final reducer 71 and the steering box 132.

Figure 10:
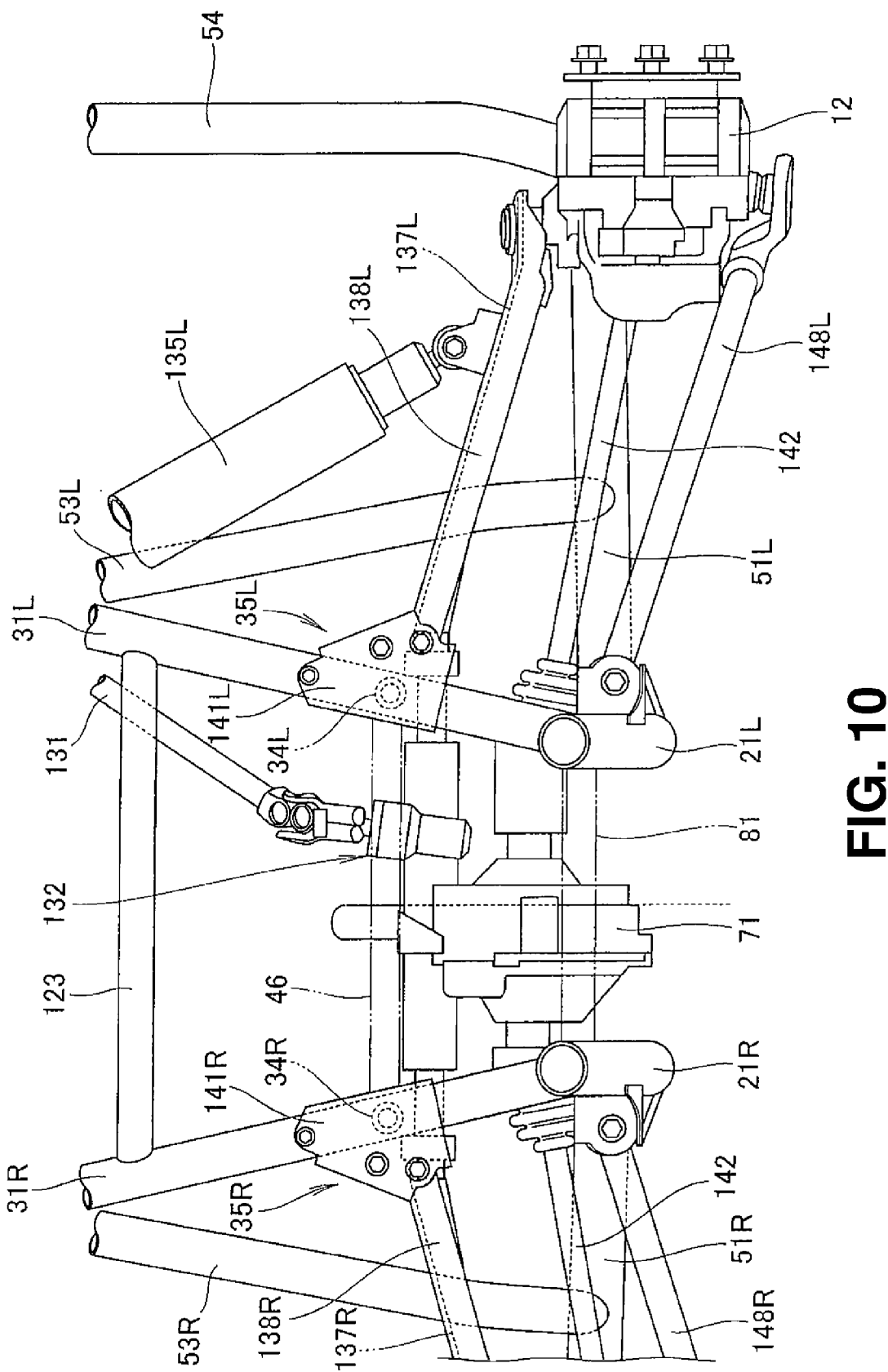
FIG. 10 is a view as viewed from arrow 10 of FIG. 9.
Figure 11:
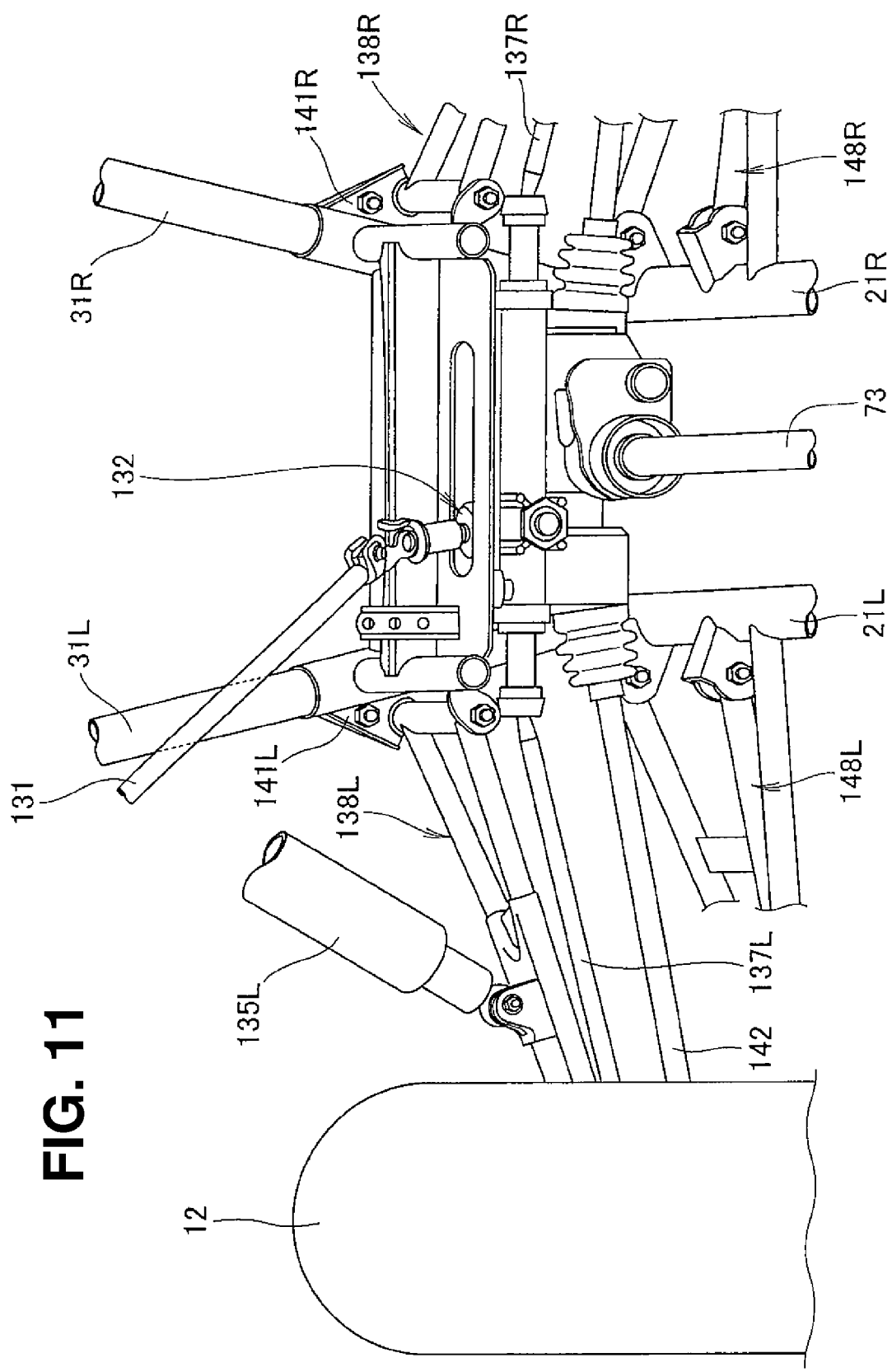
FIG. 11 is a view as viewed from arrow 11 of FIG. 9.

Referring to FIGS. 10 and 11, the front wheels 12 (only a left front wheel 12 is shown and this applies to the following) are attached to the corresponding distal ends of the front suspension arms 138L, 138R, 148L, 148R extending from the vehicle body. Front wheel axles 142, 142 transmitting the drive force of the engine extend from the front final reducer 71 to the respective front wheels 12.

A tie rod 137L extending from the steering box 132 to the corresponding front wheel 12 and an upper suspension arm 138L extending from the front reinforcing pipe 34L to the corresponding front wheel 12 are arranged to overlap each other, as viewed from the front of the vehicle. Similarly, a tie rod 137R extending from the steering box 132 to the corresponding front wheel 12 and an upper suspension arm 138R extending from the front reinforcing pipe 34R to the corresponding front wheel 12 are arranged to overlap each other as viewed from the front of the vehicle.

Arm brackets 141L, 141R serving as constituent elements of the respective front wheel suspension arm attachment portions 35L, 35R extend downward from the respective front reinforcing pipes 34L, 34R. The bases of the upper suspension arms 138L, 138R are joined to the respective arm brackets 141L, 141R.

If the tie rod and the upper suspension arm are not arranged to overlap each other as viewed from the front of the vehicle, a difference between a distance between left and right wheel front ends and a distance between left and right wheel rear ends (toe-in) may be increased in some cases.

Accordingly, the tie-rods 137L and 137R overlap the upper suspension arms 138L and 138R, respectively, as viewed from the front of the vehicle in the present invention. Therefore, a variation in the toe-in of the front wheel 12 can be suppressed.

Incidentally, although the present invention is applied to the low-floor vehicle in the embodiment, it can be applied to general vehicles.

For example, according to the first aspect of the present invention, it is reasonable to interpret that the front bumper support pipe, the front reinforcing pipe and the central frame member do not extend in a straight line as viewed from the side of the vehicle.

Also, according to the second aspect of the present invention, it is reasonable to interpret that the rigidity of the front reinforcing pipe is made equal to or greater than that of the central frame member. The present invention is suitable for four-wheeled vehicles.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A vehicle frame structure comprising a body frame having a front frame portion and a center frame portion, said front frame portion comprising:
   a pair of left and right lower front frame sections disposed at a lower portion of a vehicle body and extending in a longitudinal direction of the vehicle;
   a pair of left and right upper front frame sections joined to corresponding front end portions of the lower front frame sections, each of said left and right upper front frame sections extending upwardly for a predetermined distance, and then bending rearwardly and extending substantially in the longitudinal direction of the vehicle;
   a pair of left and right front reinforcing pipes joined to the respective upper front frame sections, said reinforcing pipes extending substantially in the longitudinal direction of the vehicle and having respective front wheel suspension arm attachment portions thereon;
   a first front cross pipe connecting together front portions of the front reinforcing pipes; and
   a second front cross pipe connecting together rear portions of the front reinforcing pipes;
   and wherein the center frame portion comprises:
   a central frame member arranged at a central portion of the body frame and extending in a longitudinal direction of the vehicle, said central frame member having a front end portion joined to the second front cross pipe, and a rear end portion joined to the central frame portion behind the second front cross pipe;
   wherein the central frame member extends in a substantially straight line along with the pair of left and right front reinforcing pipes, when viewed in a side view, and
   wherein the front end portion of the central frame member is joined to the second front cross pipe at a position inwardly of a first joint portion between the left front reinforcing pipe and the second front cross pipe, and also inwardly of a second joint portion between the right front reinforcing pipe and the second front cross pipe.

2. The vehicle frame structure according to claim 1, further comprising a front bumper attached to a front end portion of the vehicle body, said front bumper having a pair of left and right front bumper support pipes extending rearwardly therefrom,
   wherein:
   the pair of left and right front bumper support pipes are joined to the pair of respective left and right upper front frame sections,
   rear end portions of the pair of left and right front bumper support pipes are joined to corresponding joint portions each between a corresponding one of the pair of left and right front reinforcing pipes and a corresponding one of the pair of left and right upper front frame sections, and
   the front bumper support pipes, the front reinforcing pipes and the central frame member extend substantially in a straight line, when viewed in a side view.

3. The vehicle frame structure according to claim 2, wherein rigidity of the front bumper support pipes is less than rigidity of the front reinforcing pipes, which are shaped in a circular cross-section; and
   wherein rigidity of the front reinforcing pipe is less than rigidity of the central frame member which has a rectangular cross-sectional shape.

4. The vehicle frame structure according to claim 2, wherein the body frame further includes
   a rear frame portion provided behind the center frame portion, said rear frame portion being attached with an engine, and configured to support a drive system for a rear wheel,
   wherein said front frame portion supports a drive system for a front wheel,
   wherein said center frame portion forms an occupying space,
   wherein a driver's seat and an occupant seat are arranged parallel to each other on the center frame portion in a vehicle-widthwise direction,
   wherein a front final reducer operable to drive the front wheel is arranged in the front frame portion, and a propeller shaft for transmitting a drive force of the engine to the front final reducer is arranged at a generally central portion of the vehicle body in a vehicle body-widthwise direction;
   wherein the center frame portion is offset to one side of the propeller shaft;
   and wherein the center frame portion and the propeller shaft overlap each other, when viewed in a side view.

5. The vehicle frame structure according to claim 2, further comprising a center console disposed between a driver's seat and an occupant seat for housing portions of the center frame and a propeller shaft therein.

6. The vehicle frame structure according to claim 2, wherein said body frame further comprises a pair of left and right central lower frame sections arranged in a lower portion of the center frame portion so as to extend in a longitudinal direction of the vehicle; and
   wherein the lower front frame sections have a circular cross-section and rigidity which is less than rigidity of the central lower frame sections, which have a rectangular cross-section.

7. The vehicle frame structure according to claim 2, further comprising a front bumper, and a front bumper lower attachment portion disposed below the front bumper and supported by the pair of left and right lower front frame sections, said front bumper lower attachment portion is configured to support both the front bumper and front bumper support pipes, and
   rigidity of the front bumper lower attachment portion is less than rigidity of the front bumper support pipes.

8. The vehicle frame structure according to claim 2, wherein said body frame further comprises a first upper crossmember joined to rear end portions of the upper front frame sections, said first upper crossmember extending in vehicle-widthwise direction, wherein said first upper crossmember is shaped in a rectangular cross-section, and has rigidity greater than rigidity of the upper front frame sections.

9. The vehicle frame structure according to claim 1, further comprising a front bumper; and front bumper support pipes for supporting the front bumper;
   wherein rigidity of the front bumper support pipes is less than rigidity of the front reinforcing pipes which are shaped in a circular cross-section; and
   wherein rigidity of the front reinforcing pipes is less than rigidity of the central frame member shaped in a rectangular cross-section.

10. The vehicle frame structure according to claim 9, wherein said body frame further comprises a pair of left and right central lower frame sections arranged in a lower portion of the center frame portion so as to extend in a longitudinal direction of the vehicle; and
   wherein the lower front frame sections have a circular cross-section and rigidity which is less than rigidity of the central lower frame sections, which have a rectangular cross-section.

11. The vehicle frame structure according to claim 1, wherein the body frame further includes
   a rear frame portion provided behind the center frame portion, said rear frame portion being attached with an engine, and configured to support a drive system for a rear wheel,
   and wherein:
   said front frame portion supports a drive system for a front wheel,
   said center frame portion forms an occupying space,
   a driver's seat and an occupant seat are arranged parallel to each other on the center frame portion in a vehicle-widthwise direction,
   a front final reducer operable to drive the front wheel is arranged in the front frame portion, and a propeller shaft for transmitting a drive force of the engine to the front final reducer is arranged at a generally central portion of the vehicle body in a vehicle body-widthwise direction;
   the center frame portion is offset to one side of the propeller shaft; and
   the center frame portion and the propeller shaft overlap each other, when viewed in a side view.

12. The vehicle frame structure according to claim 1, further comprising a center console disposed between a driver's seat and an occupant seat for housing portions of the central frame member and a propeller shaft therein.

13. The vehicle frame structure according to claim 1, wherein said body frame further comprises
   a pair of left and right central lower frame sections arranged in a lower portion of the center frame portion so as to extend in a longitudinal direction of the vehicle,
   a pair of left and right rear lower frame sections arranged in a lower portion of a rear frame portion arranged behind the center frame portion so as to extend in the longitudinal direction of the vehicle,
   a first lower crossmember arranged between the lower front frame sections and the central lower frame sections so as to extend in a vehicle-widthwise direction, and the lower front frame sections and the central lower frame sections extend substantially in a straight line, when viewed in a top view,
   a second lower crossmember arranged between the central lower frame sections and the rear lower frame sections so as to extend in a vehicle-widthwise direction, wherein the rear lower frame sections are arranged outwardly of the central lower frame sections in a vehicle-widthwise direction,
   a pair of left and right side frame sections arranged so as to extend from the front to rear of the vehicle body, each of said side frame sections once bending upward and then bending downward, and being joined at a front end portion thereof with a corresponding one of the lower front frame sections, each of said side frame sections extending extends toward the longitudinal rearward and externally of the vehicle, is connected with an end of the first lower crossmember and with an end of the second lower crossmember, and is also connected at a rear end thereof with a corresponding one of the rear lower frame sections, and
   wherein the central frame member is joined at a rear end thereof with the second lower crossmember at a position inside of the pair of left and right central lower frame sections.

14. The vehicle frame structure according to claim 13, wherein said body frame further comprises reinforcing members spanned between the second lower crossmember and said central lower frame sections, respectively.

15. The vehicle frame structure according to claim 1, wherein said body frame further comprises a pair of left and right central lower frame sections arranged in a lower portion of the center frame portion so as to extend in a longitudinal direction of the vehicle; and
   wherein the lower front frame sections have a circular cross-section and rigidity which is less than rigidity of the central lower frame sections, which have a rectangular cross-section.

16. The vehicle frame structure according to claim 1, further comprising a front bumper, and a front bumper lower attachment portion disposed below the front bumper and supported by the pair of left and right lower front frame sections, said front bumper lower attachment portion is configured to support both the front bumper and front bumper support pipes;
   wherein rigidity of the front bumper lower attachment portion is less than rigidity of the front bumper support pipes.

17. The vehicle frame structure according to claim 1, further comprising a front bumper and front bumper support pipes, said front bumper support pipes are respectively fastened to the left and right upper frame sections via screws installed in the longitudinal direction of the vehicle.

18. The vehicle frame structure according to claim 1, wherein said body frame further comprises a first upper crossmember joined to rear end portions of the upper front frame sections, said first upper crossmember extending in vehicle-widthwise direction, wherein said first upper crossmember is shaped in a rectangular cross-section, and has rigidity greater than rigidity of the upper front frame sections.

19. The vehicle frame structure according to claim 1, wherein said body frame further comprises front elevation pipes arranged between the lower front frame sections and the front reinforcing pipes, wherein:
   the lower front frame sections, the upper front frame sections, the front reinforcing pipes and the front elevation pipes are arranged so as to surround a front final reducer operable to drive a front wheel supported on the vehicle frame and a steering box converting rotation of a steering shaft into vehicle-widthwise reciprocation, when viewed in a side view, and the lower front frame sections are disposed below the front final reducer, when viewed in a side view, and the front reinforcing pipes are disposed above the steering box and close to a recessed portion provided above an input portion of the front final reducer.

20. The vehicle frame structure according to claim 1,
wherein a tie-rod extending from a steering box to a front wheel supported on the vehicle frame and an upper suspension arm extending from one of the front reinforcing pipes to the front wheel are disposed to overlap each other, when viewed in a front view of the vehicle, and an arm bracket of a front wheel suspension arm attachment portion extends downward from the one front reinforcing pipe and a base of the upper suspension arm is joined to the arm bracket.

* * * * *